United States Patent
Ahuja et al.

(10) Patent No.: US 10,675,939 B2
(45) Date of Patent: Jun. 9, 2020

(54) PRE-COOLING AND PRE-HEATING TRANSPORTATION VEHICLES USING PREDICTIVE CROWD ESTIMATION TECHNIQUES

(71) Applicant: International Business Machines Corporation, Armonk, NY (US)

(72) Inventors: Karan Ahuja, Bangalore (IN); Heena Bansal, Bangalore (IN); Kuntal Dey, Bangalore (IN); Seema Nagar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 15/407,816

(22) Filed: Jan. 17, 2017

(65) Prior Publication Data
US 2018/0201092 A1 Jul. 19, 2018

(51) Int. Cl.
*B60H 1/00* (2006.01)
*G05B 13/02* (2006.01)

(52) U.S. Cl.
CPC ..... *B60H 1/00371* (2013.01); *B60H 1/00742* (2013.01); *B60H 1/00771* (2013.01); *G05B 13/0265* (2013.01)

(58) Field of Classification Search
CPC ............ B60H 1/00371; B60H 1/00735; B60H 1/00892; B60H 1/00745; B60H 1/00771; G05B 13/0265

(Continued)

(56) References Cited

U.S. PATENT DOCUMENTS 1,956,790 A 5/1934 Campbell
2,634,589 A 4/1953 Wilson et al.
(Continued)

FOREIGN PATENT DOCUMENTS

CN 2302158 Y 12/1998
CN 103507731 A 1/2014
(Continued)

OTHER PUBLICATIONS

Reisman et al. Crowd Detection in Video Sequences, Intelligent Vehicles Symposium, 2004, IEEE.
Arandjelovic, O., Crowd Detection from Still Images, BMVC 2008.

*Primary Examiner* — Angelina Shudy
(74) *Attorney, Agent, or Firm* — Ryan, Mason & Lewis, LLP

(57) ABSTRACT

Methods, systems, and computer program products for pre-cooling and pre-heating vehicles using crowd estimation techniques are provided herein. A computer-implemented method includes estimating the number of individuals having travelled in a vehicle over sub-routes of a fixed route, learning temporal patterns pertaining to the number of individuals in the vehicle across each of the sub-routes, predicting the number of individuals that will be in the vehicle during the sub-routes based on the patterns, computing an expected amount of time for the vehicle to complete a sub-route and arrive at a location that commences a subsequent sub-route, determining an amount by which the energy required to maintain a temperature range in the vehicle is to be modified prior to the vehicle reaching the location based on said predicting and said computing, and utilizing energy to maintain the temperature range, based on said determining, prior to the vehicle reaching the location.

20 Claims, 5 Drawing Sheets

(58) Field of Classification Search
USPC .......................................................... 701/36
See application file for complete search history.

(56) References Cited

U.S. PATENT DOCUMENTS

| | | | |
|---|---|---|---|
| 4,632,019 A | 12/1986 | Whiteman | |
| 8,892,277 B2 | 11/2014 | Shiota et al. | |
| 2008/0073057 A1* | 3/2008 | Kojima | B60H 1/00735 |
| | | | 165/43 |
| 2008/0179040 A1 | 7/2008 | Rosenbaum | |
| 2011/0172880 A1* | 7/2011 | Tamura | B60H 1/00735 |
| | | | 701/36 |
| 2012/0041627 A1* | 2/2012 | Kelty | B60L 11/1862 |
| | | | 701/22 |
| 2012/0310376 A1* | 12/2012 | Krumm | G05B 15/02 |
| | | | 700/31 |
| 2013/0046456 A1* | 2/2013 | Scofield | G01C 21/3423 |
| | | | 701/117 |
| 2013/0073094 A1* | 3/2013 | Knapton | G05B 13/02 |
| | | | 700/278 |
| 2014/0371983 A1* | 12/2014 | Miyashita | B60L 1/003 |
| | | | 701/36 |
| 2015/0105976 A1* | 4/2015 | Shikii | B60K 37/06 |
| | | | 701/36 |
| 2015/0306937 A1 | 10/2015 | Kitamura et al. | |
| 2015/0344044 A1 | 12/2015 | Yuasa | |
| 2016/0207375 A1* | 7/2016 | Gauthier | B60H 1/00778 |
| 2016/0305678 A1* | 10/2016 | Pavlovski | G05B 13/048 |
| 2017/0059337 A1* | 3/2017 | Barker | G06Q 10/047 |
| 2017/0158023 A1* | 6/2017 | Stevanovic | B60H 1/00771 |
| 2017/0238258 A1* | 8/2017 | Ramalho de Oliveira | |
| | | | H04W 52/0261 |
| | | | 455/574 |
| 2017/0278172 A1* | 9/2017 | Dey | G06Q 30/0631 |
| 2017/0371897 A1* | 12/2017 | Strong | G06F 17/30241 |
| 2018/0106631 A1* | 4/2018 | Myers | B62D 15/025 |
| 2018/0141408 A1* | 5/2018 | Filipkowski | B60H 1/00742 |
| 2018/0202686 A1* | 7/2018 | Ahuja | G06N 99/005 |
| 2018/0203443 A1* | 7/2018 | Newman | G05D 1/0055 |
| 2018/0281560 A1* | 10/2018 | Dearth | B60H 1/00821 |
| 2018/0334012 A1* | 11/2018 | Geller | B60H 1/00764 |

FOREIGN PATENT DOCUMENTS

| | | |
|---|---|---|
| CN | 104748302 A | 7/2015 |
| JP | 3842688 B2 | 10/2003 |

* cited by examiner

PRE-COOLING AND PRE-HEATING TRANSPORTATION VEHICLES USING PREDICTIVE CROWD ESTIMATION TECHNIQUES

FIELD

The present application generally relates to information technology, and, more particularly, to climate control technology.

BACKGROUND

Challenges exist for transportation vehicle heating and cooling systems with respect to how to pre-cool and/or pre-heat a given transportation vehicle running on pre-specified or fixed routes. Existing approaches are generally responsive as opposed to predictive, thereby leading to inefficient use of heating and/or cooling resources and a sub-optimal transportation experience for the vehicle operator(s) and passengers.

SUMMARY

In one embodiment of the present invention, techniques for pre-cooling and pre-heating transportation vehicles using predictive crowd estimation techniques are provided. An exemplary computer-implemented method can include estimating the number of individuals having travelled in a vehicle across each of multiple sub-routes of a fixed route travelled by the vehicle, wherein the vehicle is used for shared passenger transportation services, learning one or more temporal patterns pertaining to the number of individuals in the vehicle across each of the multiple sub-routes, and predicting the number of individuals that will be in the vehicle during one or more of the multiple sub-routes based on the one or more learned temporal patterns. The method can also include computing an expected amount of time for the vehicle to complete a current one of the sub-routes and arrive at a location that commences a subsequent one of the sub-routes, and determining an amount by which the energy required to maintain a pre-determined temperature range in the vehicle is to be modified prior to the vehicle reaching the location that commences the subsequent one of the sub-routes, such that any individuals exiting the vehicle and any individuals boarding the vehicle at the location that commences the subsequent sub-route will not cause the temperature in the vehicle to fluctuate outside of the pre-determined temperature range, wherein said determining is based on (i) said predicting and (ii) said computing. Further, the method can additionally include utilizing energy to maintain the temperature range in the vehicle, wherein the amount of energy is based on said determining, prior to the vehicle reaching the location that commences the subsequent one of the sub-routes.

In another embodiment of the invention, an exemplary computer-implemented method can include dividing a fixed route travelled by a vehicle into multiple sub-routes, wherein the vehicle is used for shared passenger transportation services, estimating the number of individuals having travelled in the vehicle across each of the multiple sub-routes, and identifying one or more temporal patterns pertaining to the number of individuals in the vehicle across each of the multiple sub-routes. Such a method can also include predicting the number of individuals that will be in the vehicle during one or more of the multiple sub-routes based on the one or more identified temporal patterns, computing an expected amount of time for the vehicle to complete a current one of the sub-routes and arrive at a location that commences a subsequent one of the sub-routes, and determining an amount by which the energy required to maintain a pre-determined temperature range in the vehicle is to be modified prior to the vehicle commencing the subsequent one of the sub-routes, such that any individuals exiting the vehicle and any individuals boarding the vehicle at the location that commences the subsequent sub-route will not cause the temperature in the vehicle to fluctuate outside of the pre-determined temperature range, wherein said determining is based on (i) the predicting step and (ii) the computing step. Further, such a method can include estimating the number of individuals in the vehicle at the conclusion of the current one of the sub-routes, and updating the determined amount by which the energy required to maintain the temperature range is to be modified prior to the vehicle commencing the subsequent one of the sub-routes based on said estimated number of individuals in the vehicle at the conclusion of the current one of the sub-routes. Additionally, such a method can include utilizing energy to maintain the temperature range in the vehicle, wherein the amount of energy is based on said updating, prior to the vehicle commencing the subsequent one of the sub-routes.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
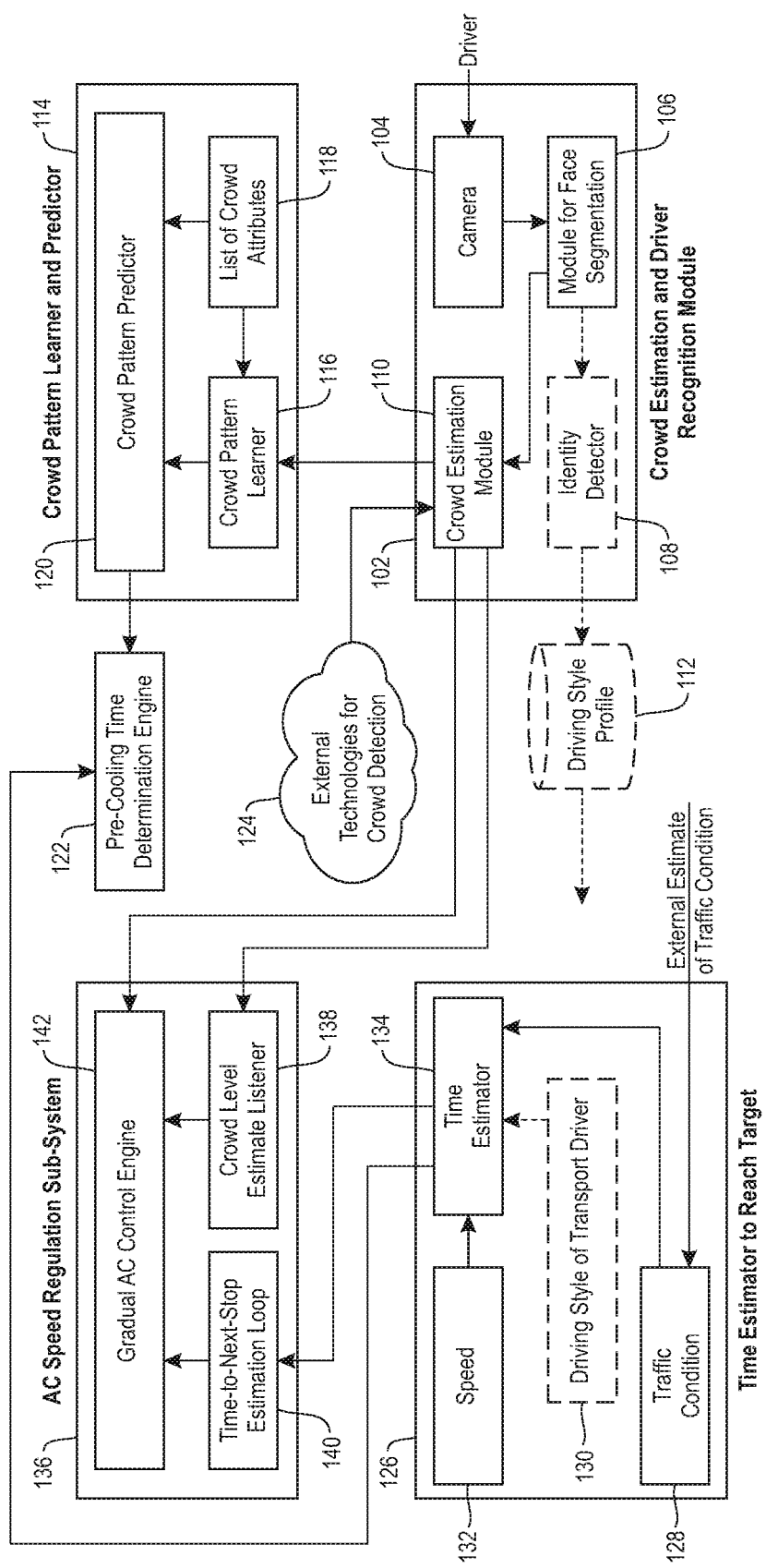
FIG. 1 is a diagram illustrating system architecture, according to an exemplary embodiment of the invention.

As described herein, an embodiment of the present invention includes pre-cooling and pre-heating transportation vehicles (such as a public bus, train, subway, etc.) running on fixed routes using predictive crowd estimation techniques. At least one embodiment of the invention includes creating a predictive model by learning crowd and/or passenger patterns based on observing a crowd for a given route of the transportation vehicle over a given period of time. In a learning phase, one or more embodiments of the invention can include implementing computer vision or one or more additional techniques to estimate the crowd size (that is, the number of individuals) in the vehicle across multiple sub-routes, across different days, different times of day, and/or different holidays. Accordingly, the data for each sub-route can encompass the following parameters: month, day of month, time of the day, holiday (or other special day), and estimated crowd density. Additionally, such data points can be derived from multiple days of observation. Further, once a sufficient number of data points has been obtained, at least one embodiment of the invention can include learning a model which can consider a given month, day, time of the day, special day or not, etc. and predict the estimated crowd level in the vehicle.

Additionally, one or more embodiments of the invention can include predicting, based on the predictive model, an expected crowd for the given route, for each day of the week and/or month, time of day, special days, etc., and dynamically controlling the vehicle heating and air conditioning system) based on the expected/predicted crowd at the next stoppage location, the crowd currently inside the vehicle, the external temperature, the estimated time to reach the next stoppage location, etc. For instance, the estimated time to reach the next stoppage location can be computed based on the current traffic conditions on the route or sub-route, the distance to the location, and the speed at which the vehicle can be driven.

As detailed herein, at least one embodiment of the invention includes pre-cooling and/or pre-heating a transportation vehicle with refined dynamism. Such an embodiment includes continuing to re-calculate the time to the expected next stoppage location B (from and after departing from location A). For example, assume that there is a sudden traffic surge, a diversion, or an accident unexpectedly slowing the flow of traffic on a route from location A to location B. In such a scenario, one or more embodiments of the invention can include automatically re-adjusting the rate of pre-cooling (or pre-heating) so that the expected and/or desired temperature will be reached only upon arrival to location B. Such an embodiment of the invention provides benefits including smoother cooling/heating (for example, current passengers will remain comfortable for the entire extra journey duration) and efficient cooling/heating cost management.

Additionally, at least one embodiment of the invention can include temperature bouncing and dampening. Assume, for example, that 25 degrees Celsius is a comfortable temperature for passengers on a bus. In such a scenario, one or more embodiments of the invention can include reducing the temperature to approximately 24 degrees Celsius as a pre-cooling phase (assuming that the new crowd volume at a forthcoming passenger pickup location will push up the temperature rapidly by approximately two degrees Celsius). Subsequently, the new crowd of passengers will push the temperature up to 26 approximately degrees Celsius, and over a subsequent period of time, the temperature will lower and settle around approximately 25 degrees Celsius due to the ongoing (post-) cooling process. Overall, the temperature deviation from the desirable 25 degrees Celsius is limited, and thus passenger comfort is efficiently maintained.

At least one embodiment of the invention includes partitioning a given route of a transportation vehicle into multiple segments (or sub-routes), such as, for example, between a pair of consecutive stoppages, a pair of multiple consecutive stoppages, etc. Such an embodiment also includes learning crowd patterns based upon crowd observations for the given route. Based on the learned crowd patterns, one or more embodiments of the invention can include creating a predictive model (that can be periodically updated for refined learning). Using the predictive model, at least one embodiment of the invention can include predicting an expected crowd for each sub-route of the given route (as well as for the overall given route) across one or more temporal parameters (for example, each day of the month, certain times of the day, special dates (public holidays, etc.)) as well as one or more other relevant attributes that might impact the crowd level. Other relevant attributes can include, for example, the season, the presence of precipitation, vacation time, festival time, etc.

Additionally, for each starting point of each sub-route, at least one embodiment of the invention includes computing the time of arrival of the transportation vehicle. Given the current crowd levels within the transportation vehicle, the estimated crowd value (that is, the estimated number of passengers on the vehicle at future points in the vehicle's route), the time left to reach the next starting point of a sub-route, and the external temperature (and, for example, the insulation efficiency of the vehicle, if available), one or more embodiments of the invention can include computing the estimated time and cooling/heating intensity needed to cool/heat the transportation vehicle to a desired level. In one or more example embodiments of the invention, Newton's law of cooling can be utilized to carry out the above-noted step. Also, at least one embodiment can include computing the estimated time and cooling/heating intensity needed to cool/heat the transportation vehicle to a desired level as a cooling/heating gradient (that is, gradually increasing cooling/heating the vehicle), and using the gradient to gradually increase the cooling/heating level within the transportation vehicle.

Further, when the transportation vehicle departs from its next sub-route starting point, one or more embodiments of the invention can include estimating the crowd (that is, the number of passengers and operators) inside the vehicle, and using that estimation as feedback to fine-tune the cooling/heating temperature and/or intensity. For example, if the estimation for a bus is that the bus will be crowded with a population count of between 29-30 riders in the next five minutes (up from its current count of 16 passengers), then the air-conditioning can be increased (that is, the set-point temperature is to be decreased). Further, if thirty minutes subsequent to that, if the estimation is that the crowd size will be reduced to 11-12 passengers from its current 30 passengers in the subsequent five minutes, then the air-conditioning can be gradually decreased (that is, the set-point temperature can be increased) beginning approximately five minutes before the thirty minute period completes.

Accordingly, one or more embodiments of the invention includes incorporating and/or implementing one or more crowd-estimation techniques (as would be known and/or understood by one of ordinary skill in the art) for estimating the number of people at a given location, a heating and/or cooling system that can be controlled programmatically, and a digital route map and current location detector (such as global positioning system (GPS)) that can be integrated for computations. Additionally, at least one embodiment of the invention can include implementing one or more external sources that can provide estimates of traffic volumes, which in turn can be used for computing traffic movement speed.

FIG. 1 is a diagram illustrating system architecture, according to an embodiment of the invention. By way of illustration, FIG. 1 depicts a crowd estimation and driver recognition module 102, a crowd pattern learner and predictor 114, a time estimator (to reach a target) 126, a pre-cooling (and pre-heating) time determination engine 122, and an air conditioning (or heating) speed regulation sub-system 136. In one or more embodiments of the invention, the components depicted in FIG. 1 can be installed and/or resident on the specific transportation vehicle in question. Alternatively, in one or more embodiments of the invention, one or more of the components depicted in FIG. 1 can be located and operated remotely via a server.

As depicted, the crowd estimation and driver recognition module 102 includes a camera 104, which can be used to capture an image of the driver and passengers, and provide input to a module 106 for face segmentation. Module 106 can subsequently provide input to an identity detector 108, which stores data into a driving style profile database 112. Such stored data can include, for each driver, the determined driving style of that driver. Driving style can include attributes such as slow-driving tendencies versus fast-driving tendencies, rash-driving tendencies, frequent braking, driving predominantly in a particular gear, etc. Additionally, the crowd estimation and driver recognition module 102 includes a crowd estimation module 110, which uses input from module 106 (such as, for example, how many different faces are observed) and external crowd detection technologies 124 (such as would be appreciated by one skilled in the art) to generate an estimation of the crowd (that is, the number of passengers and drivers) on the transportation vehicle.

As detailed herein, at least one embodiment of the invention includes dividing and/or partitioning a (known) route of the transportation vehicle into multiple different sub-routes. Such sub-routes can, for example, then be utilized by the crowd pattern learner and predictor 114, the time estimator 126, the pre-cooling (and pre-heating) time determination engine 122, and the air conditioning (or heating) speed regulation sub-system 136. As noted above, the crowd estimation module 110 generates an estimation of the crowd on the transportation vehicle, and such an estimation is provided to a crowd pattern learner module 116 within the crowd pattern learner and predictor 114. As depicted in FIG. 1, a list of one or more crowd attributes 118 is also provided to the crowd pattern learner module 116, which uses these inputs to determine a pattern and output such a learned pattern to a crowd pattern predictor 120 (also within the crowd pattern learner and predictor 114). Specifically, in one or more embodiments of the invention, the crowd pattern learner module 116 learns crowd patterns (with respect to the given transportation vehicle) over time, and thereby facilitates the creation of a predictive model (via crowd pattern predictor 120) that can predict crowd levels under different real-life conditions (and the deviation from the current crowd inside the vehicle). As further detailed below, predicted crowd levels are output to the pre-cooling (and pre-heating) time determination engine 122.

By way of example, one or more embodiments of the invention can include, for each route of a given transportation vehicle (bus route, train route, etc.), and after the vehicle reaches each stoppage location (bus stop, train station, etc.), running the crowd estimation module 110 and estimating the current crowd volume in the vehicle. Subsequently, using such estimations, the crowd learner and predictor 114 can create a machine learning model for predicting a crowd level that would be in the vehicle after the next stoppage. Also, or alternatively, the crowd learner and predictor 114 can create a rule-based and/or policy-based model, over one or more crowd attributes, which incorporates one or more parameters including the month, the time of the day, special holidays, details of the particular route, the number of alternative vehicles available along the route at different times, etc. In at least one embodiment of the invention, the above parameters can be incorporated into a predictive model via the use of a linear regression based model. Additionally, one or more embodiments of the invention can also include estimating the current crowd volume inside the vehicle, and subtracting the predicted number of passengers (the crowd) inside the vehicle at the next upcoming stoppage location, to determine the deviation from the current crowd inside the vehicle.

As also depicted in FIG. 1, the time estimator (to reach a target) 126 includes a time estimator module 134, which receives inputs in the form of the speed 132 of the vehicle, the driving style of the transportation vehicle driver 130 (which can be derived from database 112), and traffic conditions data 128. As illustrated in FIG. 1, traffic conditions data 128 can include inputs from one or more external estimates of traffic conditions, provided by one or more technologies as would be appreciated by one skilled in the art. Based on these inputs, the time estimator module 134 generates an estimated amount of time before the transportation vehicle reaches a given target location, and provides this estimation to the pre-cooling (and pre-heating) time determination engine 122. For example, in one or more embodiments of the invention, from the starting point of each sub-route, the expected time that the vehicle would arrive at the next stoppage is computed and output to the pre-cooling (and pre-heating) time determination engine 122.

By way of example, at least one embodiment of the invention can include identifying the current location of the vehicle (using, for example, GPS capabilities), and determining the next stoppage location for the vehicle, as well as the distance between the vehicle's current location and the next stoppage location (via, for example, integration of a navigation route map). One or more embodiments of the invention can additionally include obtaining external input 128 pertaining to a traffic volume estimate within this determined distance, and also obtaining the current speed 132 of the vehicle (for example, from one or more sensors attached to the vehicle) and/or historical speed data. Using the current speed 132, the historical speed data, the traffic volumes 128 and the determined distance between the vehicle's current location and the next stoppage location, the time estimator module 134 can create an estimate of the expected time that the vehicle would arrive at the next stoppage location.

Additionally, the pre-cooling (and pre-heating) time determination engine 122, based on the inputs provided by the crowd pattern predictor 120 and the time estimator module 134, pre-cools (or pre-heats) the vehicle by appropriately increasing or decreasing the set point temperature (intensity) of the air conditioning (or heating) system, based upon the expected crowd in the upcoming stoppage location (provided by the crowd pattern predictor 120) and the expected time it would take to reach that upcoming stoppage location (provided by the time estimator module 134).

By way of example, at least one embodiment of the invention can include using, as input, the predicted crowd level at the next stoppage location (provided by the crowd pattern learner and predictor 114), the current crowd level in the vehicle (provided by the crowd estimation module 110), the time estimate for the transportation vehicle to reach the next stoppage location (provided by the time estimator module 134), the capacity of the cooling/heating system of the vehicle, and the insulation levels of the vehicle. Thereby, such an embodiment can include determining the distance from which the temperature of the vehicle ought to be changed, and by how much the temperature ought to be changed (using, for example, Newton's law of cooling). Further, one or more embodiments of the invention can include deferring starting the temperature change to as late as possible (during that sub-route), so that the current crowd inside the vehicle can enjoy the (current) temperature for a longer period of time. In determining when "as late as possible" is, at least one embodiment of the invention can include utilizing information such as how far away the next stoppage is, the amount of time required to reach the next stoppage, and the amount of time required for the heating and cooling system to reach a determined comfortable temperature for the crowd after the next stoppage, as detailed above. As such, when the determined time for changing the temperature is reached, one or more embodiments of the invention include changing the temperature (via a set-point increase or decrease) in the vehicle accordingly. Such a step can be carried out remotely (via a server, for example) or via a system resident in the vehicle, as described herein.

As also depicted in FIG. 1, the air conditioning (or heating) speed regulation sub-system 136 receives inputs from the crowd estimation module 110 and the time estimator module 134. Specifically, the crowd estimation module provides input to a crowd level estimate listener 138 (which listens to updates from the crowd estimation module 110) and a gradual air conditioning (or heating) control engine 142, both of which are included within the regulation sub-system 136. Additionally, the time estimator module 134 provides input to a time-to-next-stop estimation loop 140 (which is also included within the regulation sub-system 136, and serves the function of regularly listening to the time estimator 134). The crowd level estimate listener 138 and the time-to-next-stop estimation loop 140 (along with the crowd estimation module 110, as noted) provide input to the control engine 142, which can adjust the cooling (or heating) system of the vehicle based on those inputs. By way of example, in at least one embodiment of the invention, after each stoppage, the crowd level estimate listener 138 estimates (and provides to the control engine 142) the crowd volume (that is, the number of people) inside the transportation vehicle. Based on this estimation, and in conjunction with input from the time-to-next-stop estimation loop 140, the control engine 142 can thereby re-adjust the cooling (or heating) system to fine-tune the temperature inside the vehicle.

By way of example, at least one embodiment of the invention can include performing a crowd estimation-based update of cooling or heating the vehicle. Such an update can be invoked, for example, every time the transportation vehicle commences a sub-route. In connection with such an embodiment, it can be assumed that at the preceding stoppage location, one or more passengers would have boarded the vehicle while one or more passengers would have exited the vehicle. At such a stage, because of the earlier pre-cooling or pre-heating (that is, an increase or decrease of the vehicle temperature), the temperature would have been set based upon the predicted crowd volume. Such an embodiment can be carried out in situations wherein the prediction-based temperature needs to be modified due to a change in one or more variables (such as, for example, more or fewer passengers boarding the vehicle at a stoppage location than predicted). Accordingly, after each stoppage, the current crowd volume inside the transportation vehicle can be re-estimated (via listener component 138, for example), and subsequently, the cooling/heating system can be re-adjusted (via regulation sub-system 136) to fine-tune the temperature based on that re-estimation.

Figure 2:
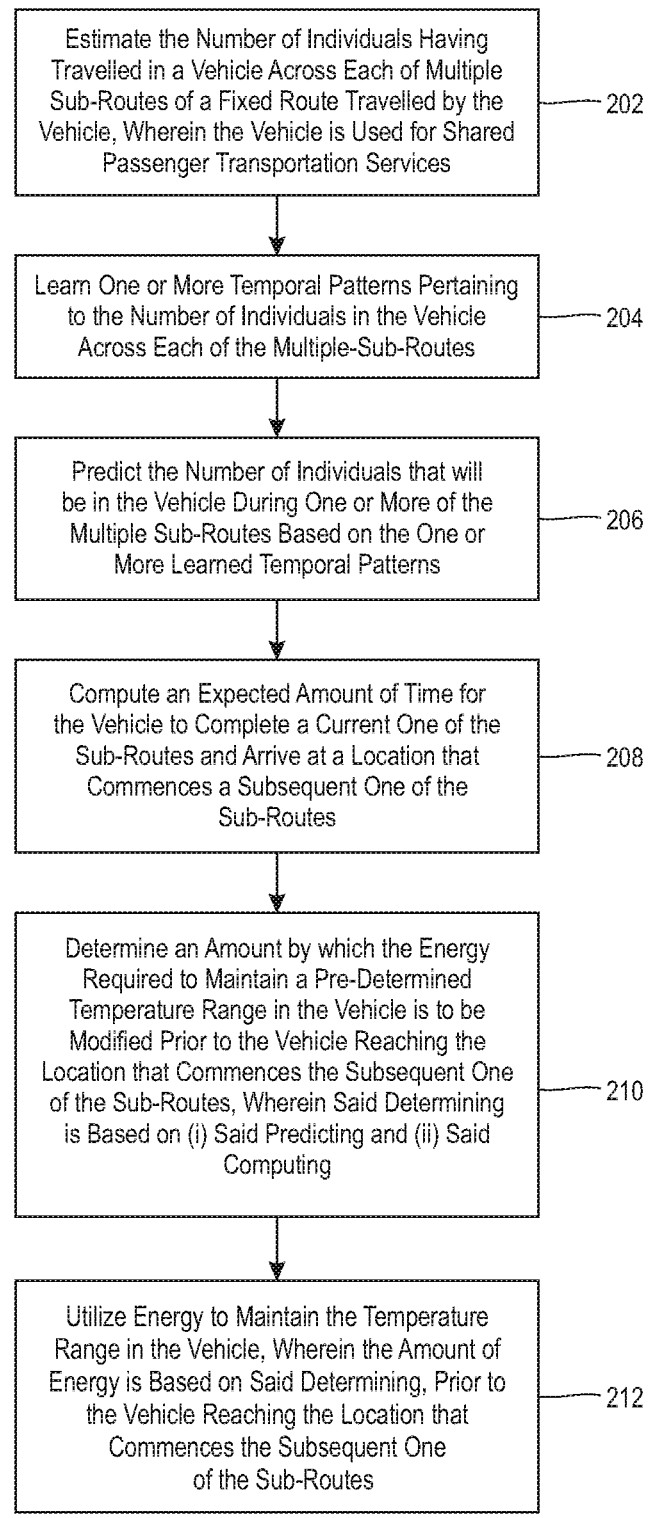
FIG. 2 is a flow diagram illustrating techniques according to an embodiment of the invention.

FIG. 2 is a flow diagram illustrating techniques according to an embodiment of the present invention. Step 202 includes estimating the number of individuals having travelled in a vehicle across each of multiple sub-routes of a fixed route travelled by the vehicle, wherein the vehicle is used for shared passenger transportation services. As detailed herein, the vehicle can include a bus, a train, a subway, etc. Additionally, estimating can include estimating the number of individuals having travelled in the vehicle after concluding each of the multiple sub-routes.

Step 204 includes learning one or more temporal patterns pertaining to the number of individuals in the vehicle across each of the multiple sub-routes. Step 206 includes predicting the number of individuals that will be in the vehicle during one or more of the multiple sub-routes based on the one or more learned temporal patterns. At least one embodiment of the invention can include creating a predictive model for carrying out said predicting under one or more variable conditions. The predictive model can determine, for a given one of the sub-routes, a deviation from a current number of individuals in the vehicle. Also, the predictive model can include a rule-based model incorporating one or more attributes such as the day of the week, the time of day, identification of one or more holidays, and the number of alternative vehicles available along the fixed route at one or more different times.

Step 208 includes computing an expected amount of time for the vehicle to complete a current one of the sub-routes and arrive at a location that commences a subsequent one of the sub-routes. This computing can be based on (i) the current location of the vehicle, (ii) the distance that the vehicle needs to travel to reach the location that commences a subsequent one of the sub-routes, (iii) one or more traffic conditions between the current location of the vehicle and the location that commences a subsequent one of the sub-routes, and (iv) one or more items of vehicle speed data.

Step 210 includes determining an amount by which the energy required to maintain a pre-determined temperature range in the vehicle is to be modified prior to the vehicle reaching the location that commences the subsequent one of the sub-routes, such that any individuals exiting the vehicle and any individuals boarding the vehicle at the location that commences the subsequent sub-route will not cause the temperature in the vehicle to fluctuate outside of the pre-determined temperature range, wherein said determining is based on (i) said predicting and (ii) said computing. Such a determination can be further based on the current number of individuals in the vehicle and/or capacity of a temperature control system of the vehicle. Additionally, the determining step can include determining the distance from the location that commences the subsequent one of the sub-routes at which energy modification is to be commenced.

Step 212 includes utilizing energy to maintain the temperature range in the vehicle, wherein the amount of energy is based on said determining, prior to the vehicle reaching the location that commences the subsequent one of the sub-routes. Utilizing can include temporarily increasing a set-point temperature associated with a temperature control system of the vehicle and/or temporarily decreasing a set-point temperature associated with a temperature control system of the vehicle.

The techniques depicted in FIG. 2 can also include estimating the number of individuals in the vehicle at the conclusion of the current one of the sub-routes, and updating the determined amount by which the energy required to maintain a pre-determined temperature range in the vehicle is to be modified based on said estimated number of individuals in the vehicle at the conclusion of the current one of the sub-routes.

Also, an additional embodiment of the invention includes dividing a fixed route travelled by a vehicle into multiple sub-routes, wherein the vehicle is used for shared passenger transportation services, estimating the number of individuals having travelled in the vehicle across each of the multiple sub-routes, and identifying one or more temporal patterns pertaining to the number of individuals in the vehicle across each of the multiple sub-routes. Such an embodiment can also include predicting the number of individuals that will be in the vehicle during one or more of the multiple sub-routes based on the one or more identified temporal patterns, computing an expected amount of time for the vehicle to complete a current one of the sub-routes and arrive at a location that commences a subsequent one of the sub-routes, and determining an amount by which the energy required to maintain a pre-determined temperature range in the vehicle is to be modified prior to the vehicle commencing the subsequent one of the sub-routes, such that any individuals exiting the vehicle and any individuals boarding the vehicle at the location that commences the subsequent sub-route will not cause the temperature in the vehicle to fluctuate outside of the pre-determined temperature range, wherein said determining is based on (i) the predicting step and (ii) the computing step. Further, such an embodiment can include estimating the number of individuals in the vehicle at the conclusion of the current one of the sub-routes, and updating the determined amount by which the energy required to maintain the temperature range is to be modified prior to the vehicle commencing the subsequent one of the sub-routes based on said estimated number of individuals in the vehicle at the conclusion of the current one of the sub-routes. Additionally, such an embodiment can include utilizing energy to maintain the temperature range in the vehicle, wherein the amount of energy is based on said updating, prior to the vehicle commencing the subsequent one of the sub-routes.

At least one embodiment of the invention (such as the techniques depicted in FIG. 2, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives crowd prediction information and sub-route time estimation information sent from at least one data source to the transmission server. The server can process the information, for example, based upon user-provided user preference information that is stored in memory on the server. Subsequently, an alert is generated containing pre-cooling (or pre-heating) information. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
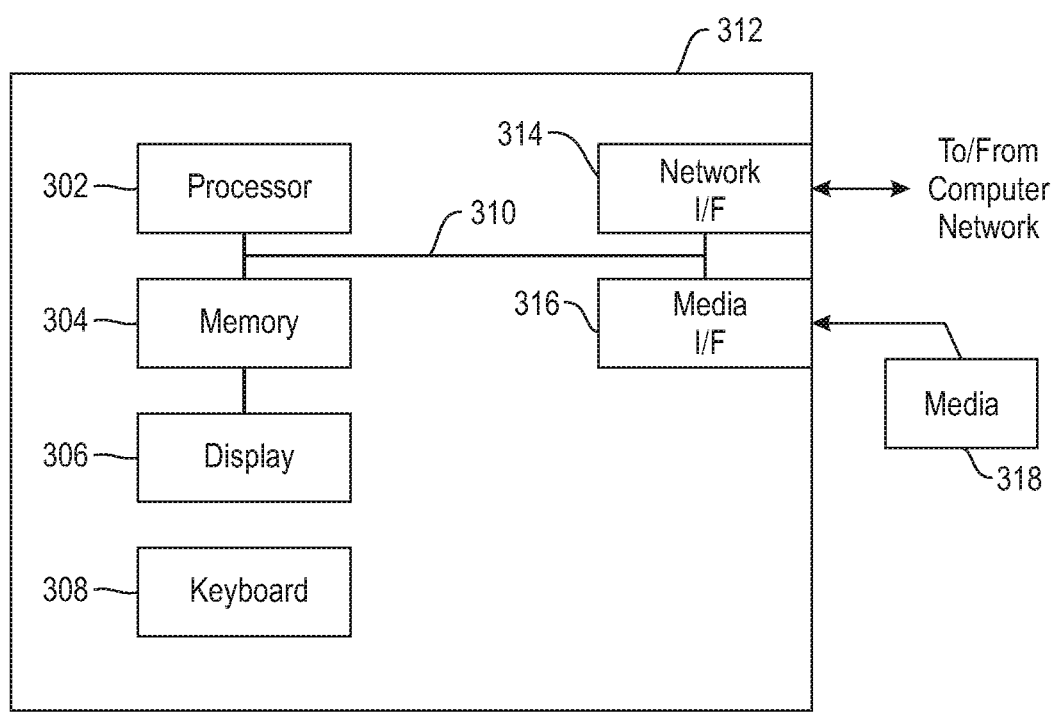
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
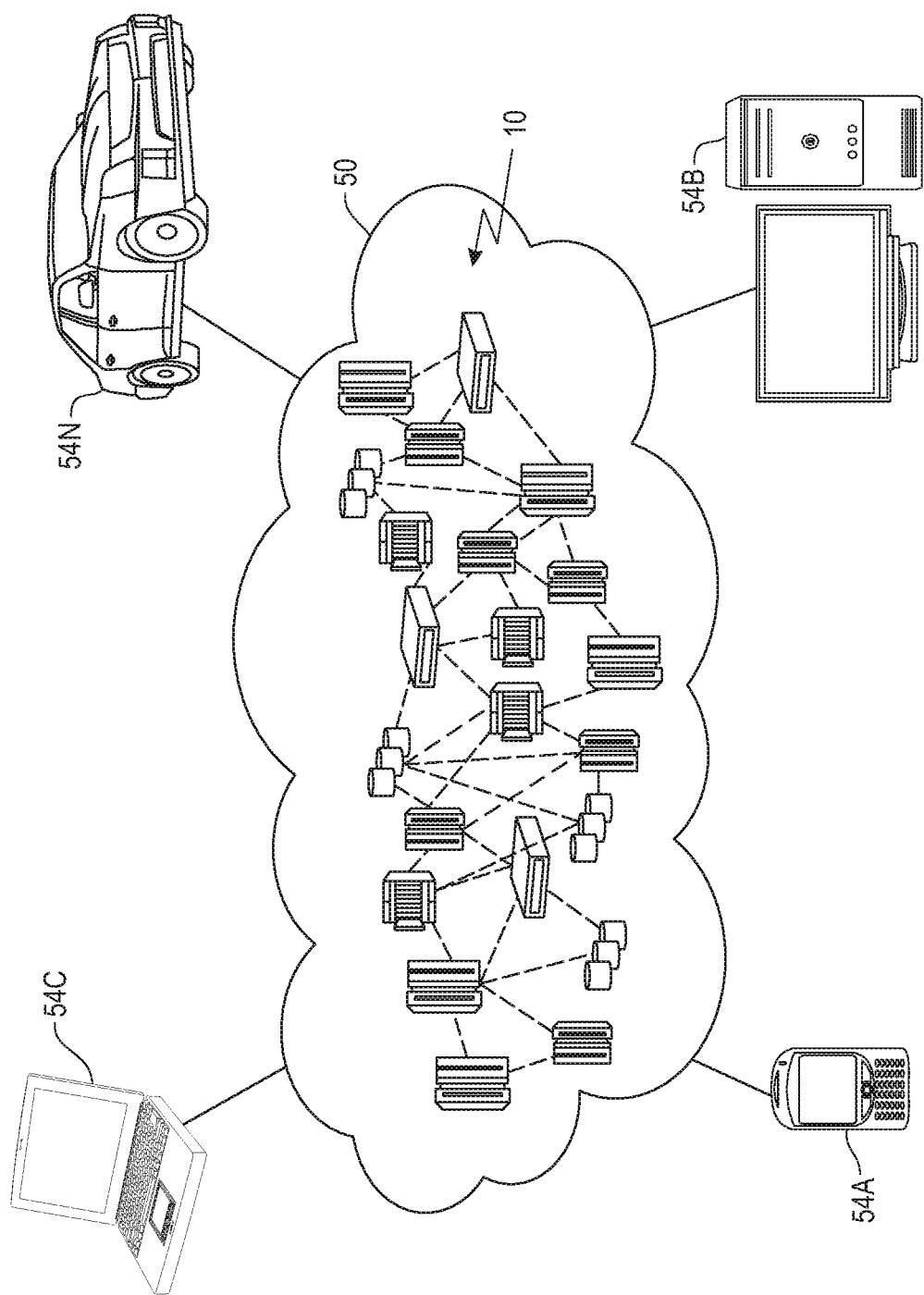
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
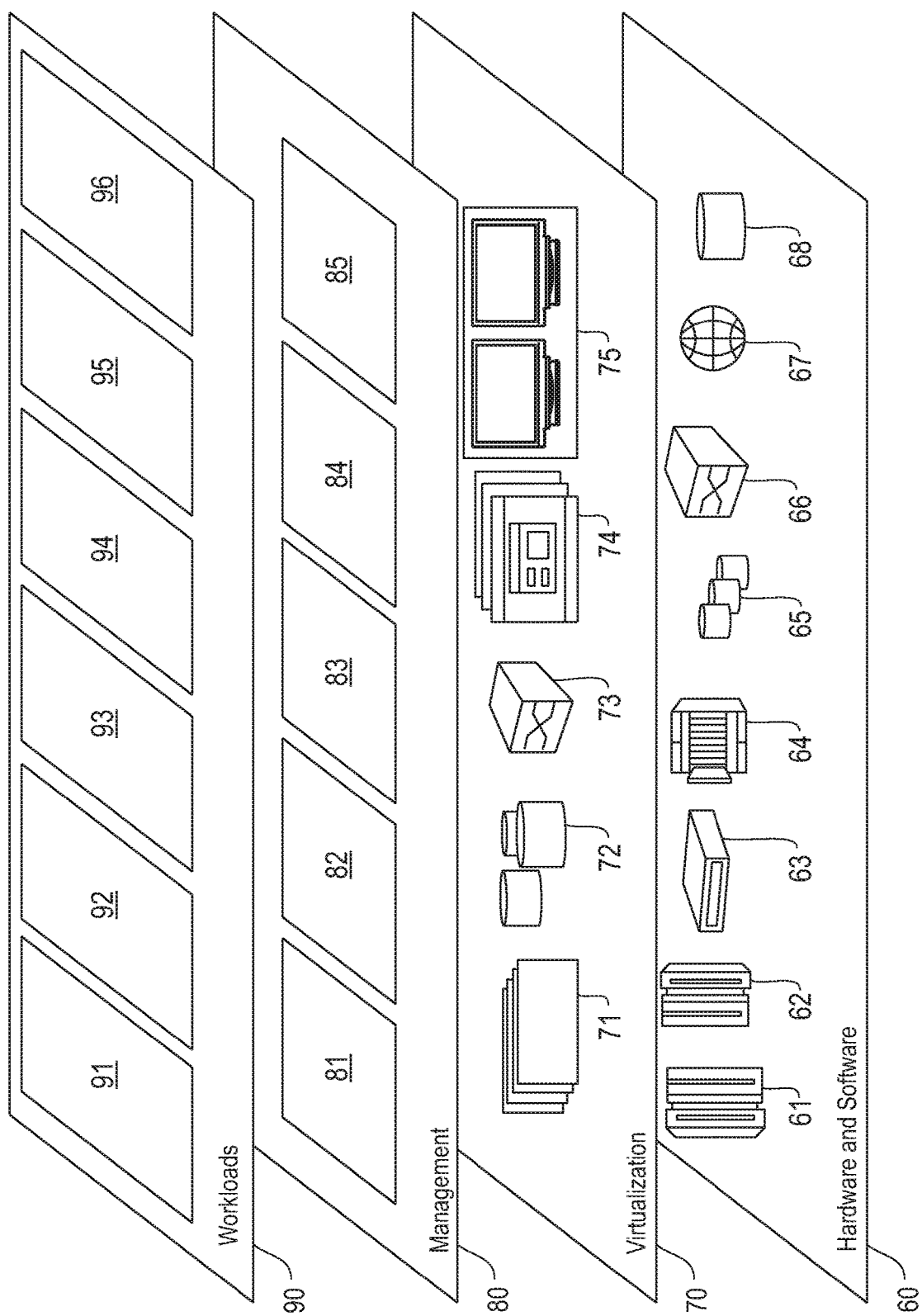
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and pre-cooling/pre-heating 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, dynamically controlling internal temperature of a vehicle based on crowd and time estimation models.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    estimating a number of individuals having travelled in a vehicle across each of multiple sub-routes of a fixed route travelled by the vehicle, wherein the vehicle is used for shared passenger transportation services;
    creating a machine learning model for predicting vehicle crowd levels by learning one or more temporal patterns pertaining to the number of individuals in the vehicle across each of the multiple sub-routes;
    predicting the number of individuals that will be in the vehicle during one or more of the multiple sub-routes by applying the machine learning model to image data pertaining to the vehicle and the individuals therein;

computing an expected amount of time for the vehicle to complete an in-progress one of the multiple sub-routes and arrive at a location that commences a subsequent one of the multiple sub-routes, wherein said computing the expected amount of time is based at least in part on data pertaining to the driver of the vehicle, identified via the image data pertaining to the vehicle and the individuals therein, and wherein the data pertaining to the driver of the vehicle comprise information pertaining to driving speed tendencies attributed to the driver, information pertaining to braking tendencies attributed to the driver, and information pertaining to gear usage tendencies attributed to the driver;

determining an amount of energy by which the energy required to maintain a pre-determined temperature range in the vehicle is to be modified prior to the vehicle reaching the location that commences the subsequent one of the multiple sub-routes, whereby any individuals exiting the vehicle and any individuals boarding the vehicle at the location that commences the subsequent one of the multiple sub-routes will not cause temperature in the vehicle to fluctuate outside of the pre-determined temperature range, wherein said determining is based on (i) said predicting and (ii) said computing;

determining a time at which to start modifying energy usage to maintain the pre-determined temperature range in the vehicle prior to the vehicle reaching the location that commences the subsequent one of the multiple sub-routes; and modifying, at the determined time at which to start modifying, the energy usage to maintain the pre-determined temperature range in the vehicle, wherein said modifying the energy usage is based on said determining, prior to the vehicle reaching the location that commences the subsequent one of the multiple sub-routes;

wherein the method is performed by at least one computing device.

2. The computer-implemented method of claim 1, comprising:

estimating the number of individuals in the vehicle at a conclusion of the current one of the multiple sub-routes; and updating the determined amount by which the energy required to maintain a pre-determined temperature range in the vehicle is to be modified based on said estimated number of individuals in the vehicle at the conclusion of the current one of the multiple sub-routes.

3. The computer-implemented method of claim 1, wherein the vehicle comprises one of a bus, a train, and a subway.

4. The computer-implemented method of claim 1, wherein said estimating the number of individuals having travelled in a vehicle across each of multiple sub-routes of a fixed route travelled by the vehicle comprises estimating the number of individuals having travelled in the vehicle after concluding each of the multiple sub-routes.

5. The computer-implemented method of claim 1, comprising:

creating a predictive model for carrying out said predicting under one or more variable conditions.

6. The computer-implemented method of claim 5, wherein the predictive model determines, for a given one of the multiple sub-routes, a deviation from aan the number of individuals in the vehicle of an in-progress sub-route.

7. The computer-implemented method of claim 5, wherein the predictive model comprises a rule-based model incorporating one or more attributes.

8. The computer-implemented method of claim 7, wherein the one or more attributes comprises day of a week.

9. The computer-implemented method of claim 7, wherein the one or more attributes comprises time of day.

10. The computer-implemented method of claim 7, wherein the one or more attributes comprises identification of one or more holidays.

11. The computer-implemented method of claim 7, wherein the one or more attributes comprises a number of alternative vehicles available along the fixed route at different times.

12. The computer-implemented method of claim 1, wherein said computing is based on (i) the current location of the vehicle, (ii) the distance that the vehicle needs to travel to reach the location that commences a subsequent one of the multiple sub-routes, (iii) one or more traffic conditions between a current location of the vehicle and a location that commences a subsequent one of the multiple sub-routes, and (iv) one or more items of vehicle speed data.

13. The computer-implemented method of claim 1, wherein said determining is further based on a current number of individuals in the vehicle.

14. The computer-implemented method of claim 1, wherein said determining is further based on capacity of a temperature control system of the vehicle.

15. The computer-implemented method of claim 1, wherein said determining the amount of energy by which the energy required to maintain a pre-determined temperature range in the vehicle is to be modified prior to the vehicle reaching the location that commences the subsequent one of the multiple sub-routes comprises determining a distance from the location that commences the subsequent one of the multiple sub-routes at which energy modification is to be commenced.

16. The computer-implemented method of claim 1, wherein said utilizing comprises increasing a set-point temperature associated with a temperature control system of the vehicle.

17. The computer-implemented method of claim 1, wherein said utilizing comprises decreasing a set-point temperature associated with a temperature control system of the vehicle.

18. A computer program product comprising a non-transitory computer readable storage medium having program instructions embodied therewith, the program instructions executable by a device to cause the device to:

estimate a number of individuals having travelled in a vehicle across each of multiple sub-routes of a fixed route travelled by the vehicle, wherein the vehicle is used for shared passenger transportation services;

create a machine learning model for predicting vehicle crowd levels by learning one or more temporal patterns pertaining to the number of individuals in the vehicle across each of the multiple sub-routes;

predict the number of individuals that will be in the vehicle during one or more of the multiple sub-routes by applying the machine learning model to image data pertaining to the vehicle and the individuals therein;

compute an expected amount of time for the vehicle to complete an in-progress one of the multiple sub-routes and arrive at a location that commences a subsequent one of the multiple sub-routes, wherein said computing the expected amount of time is based at least in part on data pertaining to the driver of the vehicle, identified via the image data pertaining to the vehicle and the individuals therein, and wherein the data pertaining to the driver of the vehicle comprise information pertaining to driving speed tendencies attributed to the driver, information pertaining to braking tendencies attributed to the driver, and information pertaining to gear usage tendencies attributed to the driver;

determine an amount of energy by which the energy required to maintain a pre-determined temperature range in the vehicle is to be modified prior to the vehicle reaching the location that commences the subsequent one of the multiple sub-routes, whereby any individuals exiting the vehicle and any individuals boarding the vehicle at the location that commences the subsequent one of the multiple sub-routes will not cause temperature in the vehicle to fluctuate outside of the pre-determined temperature range, wherein said determining is based on (i) said predicting and (ii) said computing;

determine a time at which to start modifying energy usage to maintain the pre-determined temperature range in the vehicle prior to the vehicle reaching the location that commences the subsequent one of the multiple sub-routes; and modify, at the determined time at which to start modifying, the energy usage to maintain the pre-determined temperature range in the vehicle, wherein said modifying the energy usage is based on said determining, prior to the vehicle reaching the location that commences the subsequent one of the multiple sub-routes.

19. A system comprising:

a memory; and at least one processor operably coupled to the memory and configured for:

estimating a number of individuals having travelled in a vehicle across each of multiple sub-routes of a fixed route travelled by the vehicle, wherein the vehicle is used for shared passenger transportation services;

creating a machine learning model for predicting vehicle crowd levels by learning one or more temporal patterns pertaining to the number of individuals in the vehicle across each of the multiple sub-routes;

predicting the number of individuals that will be in the vehicle during one or more of the multiple sub-routes by applying the machine learning model to image data pertaining to the vehicle and the individuals therein;

computing an expected amount of time for the vehicle to complete an in-progress one of the multiple sub-routes and arrive at a location that commences a subsequent one of the multiple sub-routes, wherein said computing the expected amount of time is based at least in part on data pertaining to the driver of the vehicle, identified via the image data pertaining to the vehicle and the individuals therein, and wherein the data pertaining to the driver of the vehicle comprise information pertaining to driving speed tendencies attributed to the driver, information pertaining to braking tendencies attributed to the driver, and information pertaining to gear usage tendencies attributed to the driver;

determining an amount of energy by which the energy required to maintain a pre-determined temperature range in the vehicle is to be modified prior to the vehicle reaching the location that commences the subsequent one of the multiple sub-routes, whereby any individuals exiting the vehicle and any individuals boarding the vehicle at the location that commences the subsequent one of the multiple sub-routes will not cause temperature in the vehicle to fluctuate outside of the pre-determined temperature range, wherein said determining is based on (i) said predicting and (ii) said computing;

determining a time at which to start modifying energy usage to maintain the pre-determined temperature range in the vehicle prior to the vehicle reaching the location that commences the subsequent one of the multiple sub-routes; and modifying, at the determined time at which to start modifying, the energy usage to maintain the pre-determined temperature range in the vehicle, wherein said modifying the energy usage is based on said determining, prior to the vehicle reaching the location that commences the subsequent one of the multiple sub-routes.

20. A computer-implemented method, comprising:

dividing a fixed route travelled by a vehicle into multiple sub-routes, wherein the vehicle is used for shared passenger transportation services;

estimating a number of individuals having travelled in the vehicle across each of the multiple sub-routes;

creating a machine learning model for predicting vehicle crowd levels by identifying one or more temporal patterns pertaining to the number of individuals in the vehicle across each of the multiple sub-routes;

predicting the number of individuals that will be in the vehicle during one or more of the multiple sub-routes by applying the machine learning model to image data pertaining to the vehicle and the individuals therein;

computing an expected amount of time for the vehicle to complete an in-progress one of the multiple sub-routes and arrive at a location that commences a subsequent one of the multiple sub-routes, wherein said computing the expected amount of time is based at least in part on data pertaining to the driver of the vehicle, identified via the image data pertaining to the vehicle and the individuals therein, and wherein the data pertaining to the driver of the vehicle comprise information pertaining to driving speed tendencies attributed to the driver, information pertaining to braking tendencies attributed to the driver, and information pertaining to gear usage tendencies attributed to the driver;

determining an amount of energy by which the energy required to maintain a pre-determined temperature range in the vehicle is to be modified prior to the vehicle commencing the subsequent one of the multiple sub-routes, whereby any individuals exiting the vehicle and any individuals boarding the vehicle at the location that commences the subsequent one of the multiple sub-routes will not cause temperature in the vehicle to fluctuate outside of the pre-determined temperature range, wherein said determining is based on (i) said predicting and (ii) said computing;

estimating the number of individuals in the vehicle at a conclusion of the in-progress one of the multiple sub-routes;

updating the determined amount by which the energy required to maintain the temperature range is to be modified prior to the vehicle commencing the subsequent one of the multiple sub-routes based on said estimated number of individuals in the vehicle at the conclusion of the in-progress one of the multiple sub-routes;

determining a time at which to start modifying energy usage to maintain the pre-determined temperature range in the vehicle prior to the vehicle reaching the location that commences the subsequent one of the multiple sub-routes; and modifying, at the determined time at which to start modifying, the energy usage to maintain the pre-determined temperature range in the vehicle, wherein said modifying the energy usage is based on said updating, prior to the vehicle commencing the subsequent one of the multiple sub-routes;

wherein the method is performed by at least one computing device.

* * * * *